US010215925B1

(12) United States Patent
Knights et al.

(10) Patent No.: US 10,215,925 B1
(45) Date of Patent: Feb. 26, 2019

(54) SYSTEMS AND METHODS FOR RESONANCE STABILIZATION OF MICRORING RESONATOR

(71) Applicant: MCMASTER UNIVERSITY, Hamilton, ON (CA)

(72) Inventors: Andrew P. Knights, Dundas (CA); Zhao Wang, Nepean (CA)

(73) Assignee: MCMASTER UNIVERSITY, Hamilton, ON (CA)

( * ) Notice: Subject to any disclaimer, the term of this patent is extended or adjusted under 35 U.S.C. 154(b) by 0 days.

(21) Appl. No.: 16/108,793

(22) Filed: Aug. 22, 2018

(51) Int. Cl.
| | |
|---|---|
| G02B 6/293 | (2006.01) |
| G02B 6/287 | (2006.01) |
| G02F 1/025 | (2006.01) |
| G02F 1/015 | (2006.01) |
| G02B 6/12 | (2006.01) |

(52) U.S. Cl.
CPC ....... *G02B 6/2934* (2013.01); *G02B 6/12007* (2013.01); *G02B 6/287* (2013.01); *G02F 1/025* (2013.01); *G02F 2001/0155* (2013.01); *G02F 2203/15* (2013.01); *G02F 2203/21* (2013.01)

(58) Field of Classification Search
CPC .. G02B 6/2934; G02B 6/12007; G02B 6/287; G02F 1/025; G02F 2203/15; G02F 2001/0155; G02F 2203/21
See application file for complete search history.

(56) References Cited

U.S. PATENT DOCUMENTS

| | | |
|---|---|---|
| 6,389,203 B1 | 5/2002 | Jordan et al. |
| 6,766,083 B2 | 7/2004 | Bona et al. |
| 7,058,258 B2 | 6/2006 | Yamazaki |

(Continued)

FOREIGN PATENT DOCUMENTS

WO 2012099606 7/2012

OTHER PUBLICATIONS

A.V. Krishnamoorthy et al., "Computer systems based on silicon photonic interconnects," Proc. IEEE 97(7), 1337-1361 (2009).

(Continued)

*Primary Examiner* — John Bedtelyon
(74) *Attorney, Agent, or Firm* — Hill & Schumacher

(57) ABSTRACT

Systems and methods are provided for stabilizing the resonance properties of a microring resonator modulator. Intrinsic optical absorption within the p-n junction of a microring modulator resonator is employed as a feedback signal for thermally stabilizing the microring resonator modulator. In some example embodiments, the input optical power provided to a bus waveguide that is optically coupled to the microring resonator modulator is sufficiently low such that the photocurrent dependence on input power is predominantly linear in nature, thereby avoiding or reducing the effect of nonlinear absorption through two-photon absorption. The example embodiments described herein may be employed to achieve a fabrication process that is free of heterogeneous device integration, for example, avoiding the integration of germanium detectors with a silicon-based integrated optical circuit or the need to sacrifice a portion of the ring resonator circumference for the integration of an extrinsic defect-mediated photodetector, thus reducing complexity and manufacturing cost.

22 Claims, 12 Drawing Sheets

(56) References Cited

U.S. PATENT DOCUMENTS

| | | | |
|---|---|---|---|
| 7,616,850 B1 | 11/2009 | Watts et al. | |
| 7,684,666 B2 | 3/2010 | Hamann et al. | |
| 7,738,794 B2* | 6/2010 | Akiyama | G02B 6/12004 398/182 |
| 8,270,778 B2* | 9/2012 | Hochberg | G02F 1/025 385/1 |
| 9,134,169 B2* | 9/2015 | Li | G01J 1/0209 |
| 9,678,370 B2* | 6/2017 | Hui | G02F 1/025 |
| 9,933,639 B1* | 4/2018 | Lin | G02F 1/025 |
| 2010/0200733 A1 | 8/2010 | McLaren | |
| 2012/0062974 A1 | 3/2012 | Manipatruni et al. | |
| 2012/0081197 A1 | 4/2012 | Park et al. | |
| 2013/0037692 A1 | 2/2013 | Akiyama | |

OTHER PUBLICATIONS

N. Ophir et al., "Silicon photonic microring links for high-bandwidth-density, low-power chip I/O," IEEE Micro 33(1), 54-67 (2013).

W.A. Zortman et al., "Bit error rate monitoring for active wavelength control of silicon microphotonic resonant modulators," IEEE Micro 33(1), 42-52 (2013).

K. Padmaraju et al., "Thermal stabilization of a microring modulator using feedback control," Opt. Express 20(27), 27999-28008 (2012).

M. W. Geis et al., "Silicon waveguide infrared photodiodes with >35 GHz bandwidth and phototransistors with 50 AW-1 response," Opt. Express 17(7), 5193-5204 (2009).

R. R. Grote et al., "10 Gb/s error-free operation of all-silicon ion-implanted-waveguide photodiodes at 1.55 μm," IEEE Photon. Technol. Lett. 25(1), 67-70 (2013).

D. F. Logan et al., "Monitoring and tuning micro-ring properties using defect-enhanced silicon photodiodes at 1550 nm," IEEE Photon. Technol. Lett. 24(4), 261-263 (2012).

K. Padmaraju et al., "Integrated thermal stabilization of a microring modulator," Proc. Optical Fiber Communication conference (Optical Society of America, 2013), paper OM2H.7.

J. Teng et al., "Athermal silicon-on-insulator ring resonators by overlaying a polymer cladding on narrowed waveguides," Opt. Express 17(17), 14627-14633 (2009).

W. A. Zortman et al., "Integrated CMOS compatible low power 10Gbps silicon photonic heater-modulator," Proc. Optical Fiber Communication Conference (Optical Society of America, 2012), paper OW4I.5.

V. Michal et al., "Single active element PID controllers," Radioelektronika, 2010 20th International Conference.

Y. -H. Chen et al., "Scalable electrical-optical thermal simulator for multicores with optical interconnects," Proc. IEEE optical Interconnects Conference (IEEE, 2013), paper MA3.

C. J. B. Fayomi et al., "Reliable circuit techniques for low-voltage analog design in deep submicron standard CMOS: a tutorial," Analog Integr. Circuits Signal Process. 39(1), 21-38 (2004).

D. Brunina et al., "10-Gb/s WDM optically-connected memory system using silicon microring modulators," Proc. European Conference on Optical Communications (Optical Society of America, 2012), paper Mo.2.A.5.

D. Livshits et al., "Cost-effective WDM optical interconnects enabled by quantum dot comb lasers," Proc. Optoelectronic Interconnects and Component Integration IX (SPIE, 2010).

A. V. Krishnamoorthy et al., "Exploiting CMOS manufacturing to reduce tuning requirements for resonant optical devices," IEEE Photon. J. 3(3), 567-579 (2011).

M. Georgas et al., "Addressing link-level design tradeoffs for integrated photonic interconnects," in Custom Integrated Circuits Conference (IEEE, 2011), 978-1-4577-0233-5/11.

P. Dong et al., "Thermally tunable silicon racetrack resonators with ultralow tuning power," Opt. Express 18(19), 20298-20304 (2010).

Manipatruni, S. et al., Wide temperature range operation of micrometerscale silicon electro-optic modulators, Opt. Lett. 33, 2185-2187 (2008).

Padmaraju, K. et al., Dynamic Stabilization of a Microring Modulator Under Thermal Perturbation, OFC/NFOEC Technical Digest (2012).

Knights et al., Defect mediated detection of wavelengths around 1550 nm in a ring resonant structure, Proceedings of SPIE vol. 7943, pp. 794308-1-794308-7, Jan. 31, 2011, DOI:10.1117/11.874018.

Liu et al.' 10-Gbps, 5.3-mW Optical transmitter and receiver circuits in 40-nm CMOS, HEEE Journal of Solid State circuits, Vol. 47, No. 9, pp. 2049-2067, Sep. 2012, DOI:10.1109/JSSC.2012/197234.

Doylend et al., Silicon photonic dynamic optical channel leveller with external feedback loop, Optics Express, vol. 18, No. 13, pp. 13805 to 13812, Jun. 7, 2010.

Dong et al., Wavelength-tunable silicon microring resonators, Optics Express, vol. 18, No. 11, pp. 10941-10946, May 24, 2010.

Qui et al., Wavelength tracking with thermally controlled silicon resonators, Optics Express, vol. 19, No. 6, pp. 5143-5148, Mar. 14, 2011.

Kimerling et al., Electronic-photonic integrated circuits on the CMOS platform, Proceedings of SPIE, vol. 6125, pp. 612502-1-612502-10, Feb. 10, 2006, DOI:101117/12.654455.

Lentine et al., Active wavelength control of silicon microphotonic resonant modulators, IEEE Conference Proceedings, Optical Interconnects Conf., 2012, TuC5, pp. 46-47, May 20-23, 2012, DOI:10.1109/OIC.2012.6224454.

International Search Report in PCT/CA2013/050761 dated Apr. 3, 2014.

Written Opinion in PCT/CA2013/050761 dated Apr. 3, 2014.

Y. Zhang, Y. Li, S. Feng, and A. W. Poon, "Towards Adaptively Tuned Silicon Microring Resonators for Optical Networks-on-Chip Applications," IEEE J. Sel. Top. Quantum Electron. 20(4), 136-149 (2014).

Bradley et al., Silicon waveguide-integrated optical power monitor with enhanced sensitivity at 1550nm, Appl. Phys. Lett. 86, 241103, 2005.

J. A. Cox, D. C. Trotter, and A. L. Starbuck, "Control of silicon-photonic micro-resonator wavelength via balanced homodyne locking," Opt. Express 22(19), 12279-12289 (2014).

H. Jayatilleka, K. Murray, M. Á. Guillén-Torres, M. Caverley, R. Hu, N. A. F. Jaeger, L. Chrostowski, and S. Bhekhar, "Wavelength tuning and stabilization of microring-based filters using silicon in-resonator photoconductive heaters," Opt. Express 23(19), 25084-25097 (2015).

Y. Li and A. W. Poon, "Active resonance wavelength stabilization for silicon microring resonators with an inresonator defect-state-absorption-based photodetector," Opt. Express 23(1), 360-372 (2015).

Melikyan, A. et al., Tapless locking of silicon ring modulators for WDM applications, 2017 Optical Fiber Communications Conference and Exhibition (OFC), 2017.

C. Qiu, J. Shu, Z. Li, X. Zhang, and Q. Xu, "Wavelength tracking with thermally controlled silicon resonators," Opt. Express 19(6), 5143-5148 (2011).

* cited by examiner

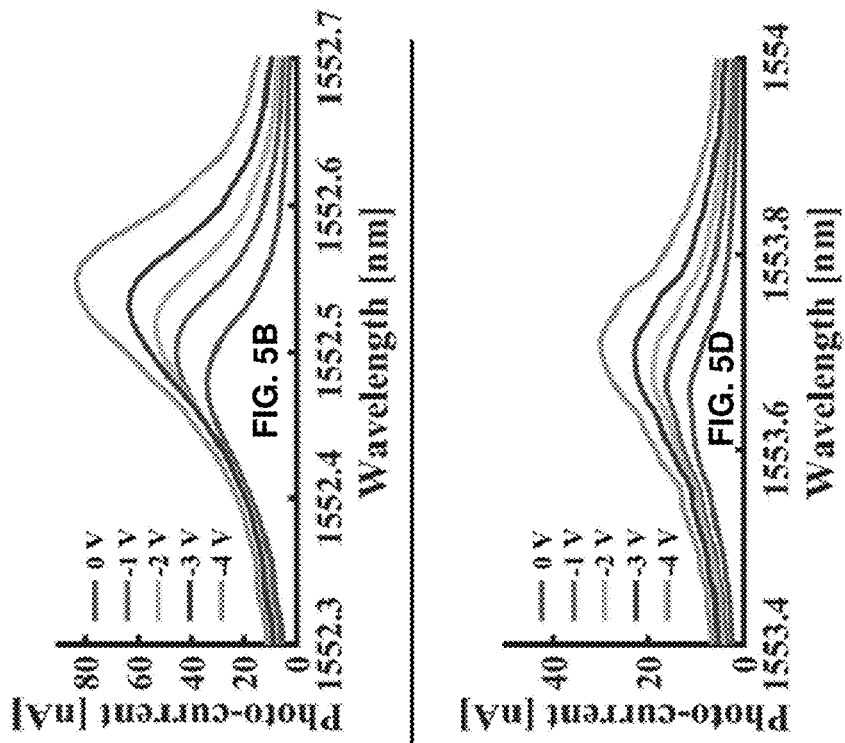
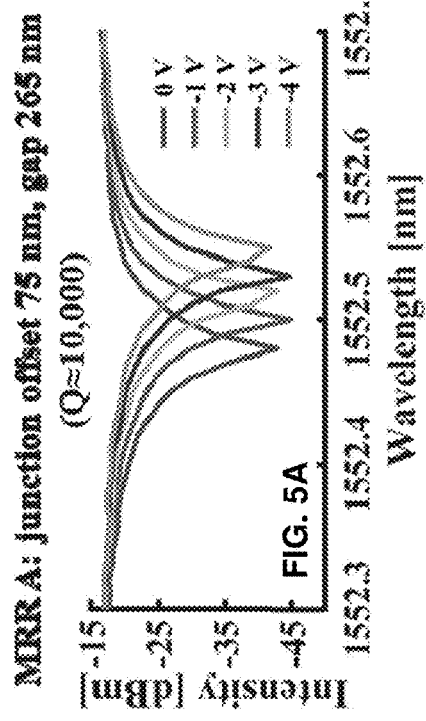
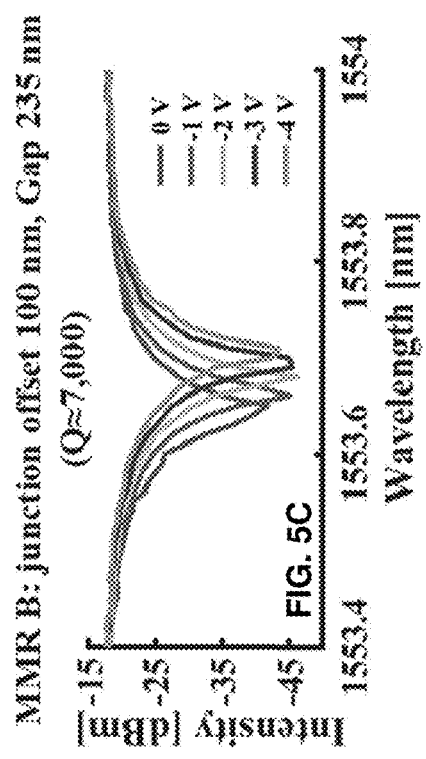

SYSTEMS AND METHODS FOR RESONANCE STABILIZATION OF MICRORING RESONATOR

BACKGROUND

The present disclosure relates to integrated optical circuits. More particularly, the present disclosure relates to the stabilization of resonant optical elements in integrated optical circuits.

The silicon microring resonator has gained significant attention for use in an energy-efficient and high-bandwidth photonic system and is ideally suited for both inter- and intra-data center communication. The small footprint of the resonator (a few hundred $\mu m^2$) allows multiple microring resonators to be cascaded on a single bus to form an elegant and compact wavelength-division-multiplexed system. Compared to other non-resonant modulators, the efficiency of the microring resonator is dramatically enhanced owing to its resonant nature. However, for the same reason, the microring resonator is susceptible to thermal fluctuation that can cause an undesired resonance variation due to the strong thermo-optic effect present in silicon waveguides. For example, in a highly clustered system, a transient thermal load in an adjacent channel or a slow ambient temperature drift can lead to a microring resonator modulator failure. Therefore, resonance control is necessary to insure the stability of the microring resonator modulator in a real-word deployment. Several methods have been reported in the literature aimed at an integrated solution for resonance control. The most common approach uses a power detector and an integrated heater that can form a closed-loop via proportional-integral-differential (PID) feedback. Other non-PID based approaches exist such as the homodyne method.

FIGS. 1 and 2 illustrate some feedback-control geometries that have been employed for the stabilization of a microring resonator modulator. In FIG. 1, the feedback signal (i.e., photocurrent) is provided by a Ge photodetector at the drop-port of the microring resonator. For a stable single wavelength input, the photodetector monitors the power variation owing to the resonance change of the microring resonator. The PID feedback-control is then applied to compensate for drift using the heater power for stabilization. In FIG. 2, a similar control method is presented, with the exception that a designated photodetector placed inside the ring is employed to measure the resonant power in order to provide the feedback signal.

SUMMARY

Systems and methods are provided for stabilizing the resonance properties of a microring resonator modulator. Intrinsic optical absorption within the p-n junction of a microring modulator resonator is employed as a feedback signal for thermally stabilizing the microring resonator modulator. In some example embodiments, the input optical power provided to a bus waveguide that is optically coupled to the microring resonator modulator is sufficiently low such that the photocurrent dependence on input power is predominantly linear in nature, thereby avoiding or reducing the effect of nonlinear absorption through two-photon absorption. The example embodiments described herein may be employed to achieve a fabrication process that is free of heterogeneous device integration, for example, avoiding the integration of germanium detectors with a silicon-based integrated optical circuit or the need to sacrifice a portion of the ring resonator circumference for the integration of an extrinsic defect-mediated photodetector, thus reducing complexity and manufacturing cost.

Accordingly, in a first aspect, there is provided a method of stabilizing the resonance properties of an optical microring modulator, wherein the optical microring modulator is evanescently coupled to a bus waveguide, the method comprising:

applying a time-dependent reverse bias to a p-n junction formed in the optical microring modulator to modulate input optical power provided to the bus waveguide;

detecting, across the p-n junction of the optical microring modulator, a photocurrent responsively generated due to optical absorption; and employing the photocurrent as a feedback parameter to thermally stabilize the resonance properties of the optical microring modulator;

wherein the input optical power provided to the bus waveguide is sufficiently low such that a linear contribution to the dependence of photocurrent on input optical power exceeds a quadratic contribution.

In another aspect, there is provided a method of stabilizing resonance properties of an optical microring modulator, wherein the optical microring modulator is evanescently coupled to a bus waveguide the method comprising:

applying a time-dependent reverse bias to a p-n junction formed in the optical microring modulator to modulate input optical power provided to the bus waveguide;

detecting, across the p-n junction of the optical microring modulator, a photocurrent responsively generated due to optical absorption; and employing the photocurrent as a feedback parameter to thermally stabilize the resonance properties of the optical microring modulator;

wherein the input optical power provided to the bus waveguide is sufficiently low such that the photocurrent is predominately generated via linear absorption of sub-band defects.

In another aspect, there is provided a stabilized resonant optical modulator system comprising:

a bus waveguide;

an optical microring modulator evanescently coupled to the bus waveguide, the optical microring modulator comprising a p-n junction;

an optical power source configured to deliver input optical power to the bus waveguide;

a heater configured to apply heat to the optical microring modulator; and control circuitry operably connected to the optical microring modulator and the heater, wherein the control circuitry is configured to:

apply a time-dependent reverse bias to the p-n junction formed in the optical microring modulator to modulate the input optical power provided to the bus waveguide;

detect, across the p-n junction of the optical microring modulator, a photocurrent responsively generated due to optical absorption; and control the heater according to a feedback signal generated based on the photocurrent to thermally stabilize resonance properties of the optical microring modulator;

wherein the optical power source is configured to provide the input optical power to the bus waveguide such a linear contribution to the dependence of photocurrent on input optical power exceeds a quadratic contribution.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 5A-5D show microring resonator spectra (FIGS. 5A and 5C; reverse bias voltage decreases from left to right) and measured photocurrent (FIGS. 5B and 5D; reverse bias voltage decreases from the lower to the upper curves), where intensity refers to light output from the chip and includes coupling and transmission loss. FIGS. 5A and 5B pertain to device A; a microring resonator modulator with junction offset 75 nm and gap 265 nm. FIGS. 5C and 5D pertain to device B; a microring resonator modulator with junction offset 0 nm and gap 235 nm.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

According to various example embodiments of the present disclosure, sub-band-state-mediated-photo-absorption that is intrinsic to an optical microring resonator modulator is detected and employed to provide a feedback signal (electrical current) that is related to the device optical transfer function. Variations in the position of the optical transfer function resulting from (for example) a temperature change in the vicinity of the microring resonator modulator can thus be monitored and corrected using an integrated micro-heater controlled using an integrated control loop operating in closed-loop mode.

Figure 3:
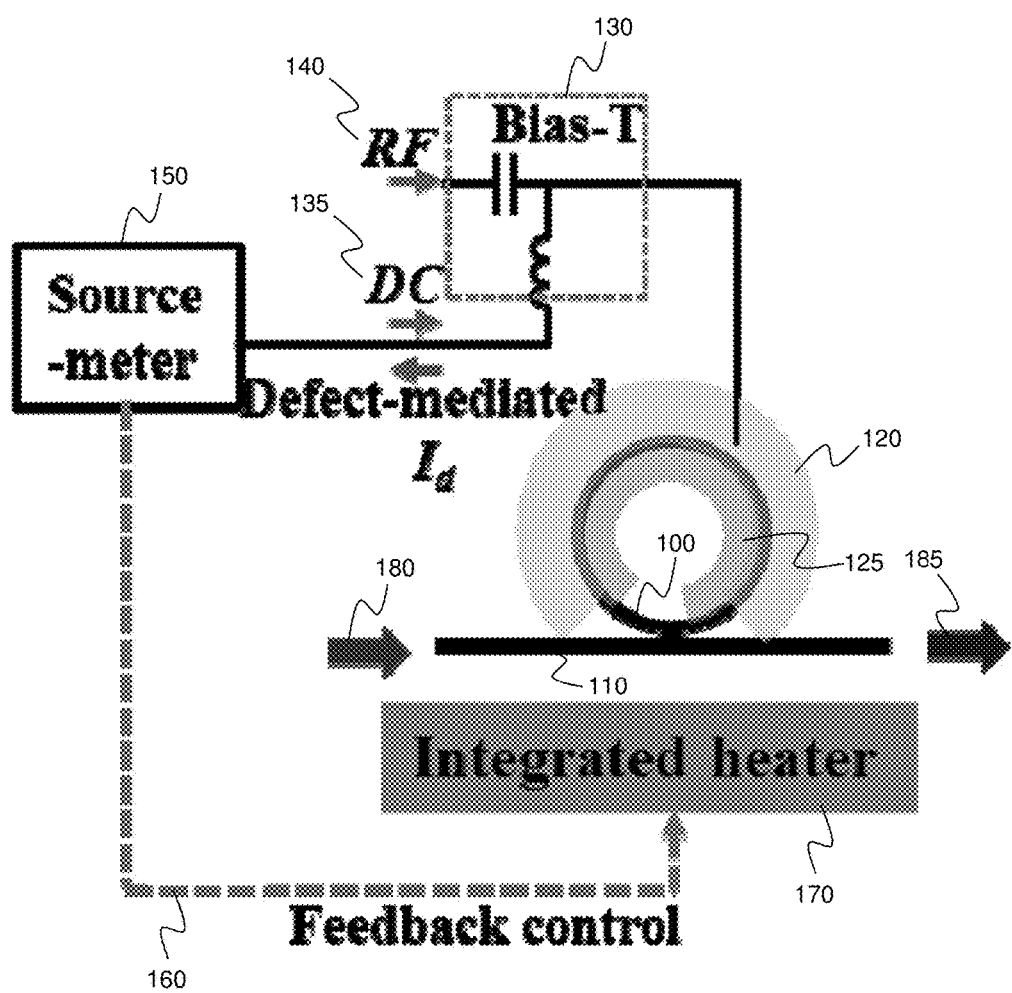
FIG. 3 schematically illustrates resonance control using the intrinsic defect-mediated photocurrent.
Figure 4:
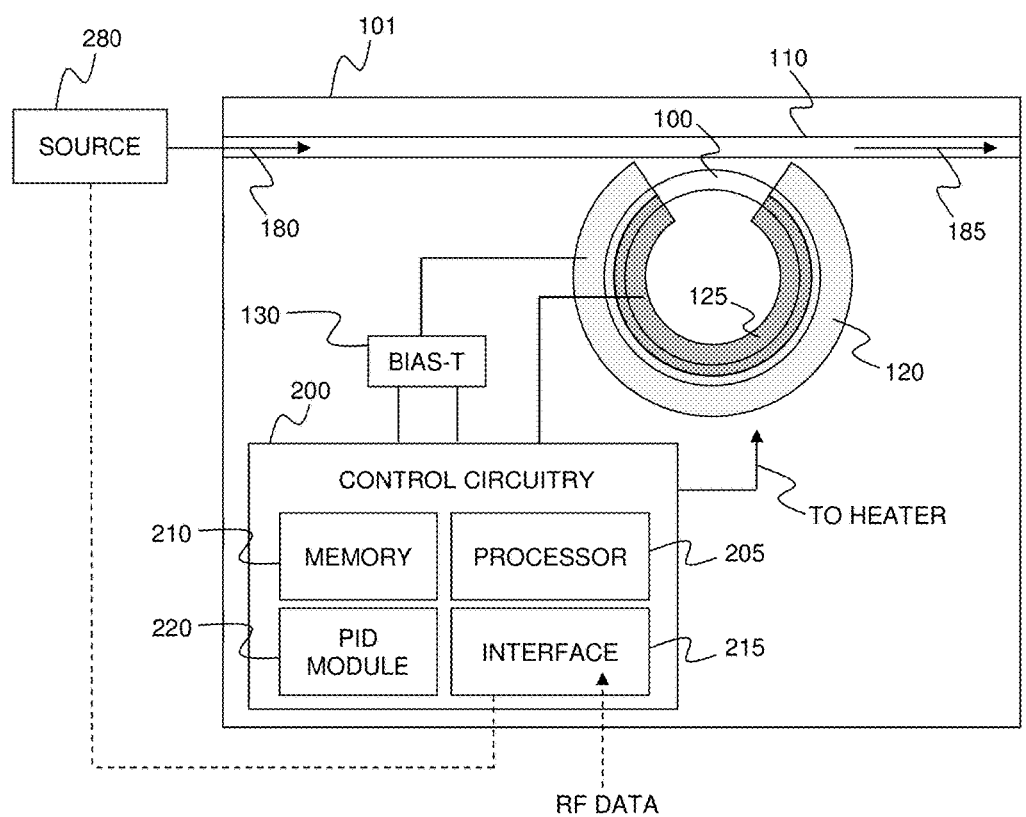
FIG. 4 is a block diagram illustrating an example system for performing resonant stabilization of a microring resonator modulator.

FIG. 3 schematically illustrates an example configuration of an optical microring resonator 100 that is thermally stabilized via the detection of a photocurrent. FIG. 4, which is described in further detail below, illustrates an example implementation of such a system in an integrated optical circuit. Referring to FIG. 3, the microring modulator 100 is evanescently coupled to a bus waveguide 110. The photocurrent is measured using the p-n junction formed from p and n-doped regions 120 and 125 during the fabrication of the modulator. As shown in the figure, a bias-T 130 may be provided to combine the DC bias 135 and RF signal 140 to drive the microring resonator modulator, modulating the input optical power 180 delivered to the bus waveguide 110 to generate modulated output optical power 185 as a time-dependent reverse bias. A source meter 150 (or other electronic integrated circuit that functions like a source meter) provides the DC bias to the microring resonator modulator 100 while simultaneously sensing the current generated by the p-n junction in reverse bias. The sensed current is employed as the feedback signal 160 to control the micro-heater 170. A feedback control loop is employed to control the micro-heater power in order to reactively compensate the temperature change on the microring resonator modulator 100, leading to a resonance stabilization.

Figure 1:
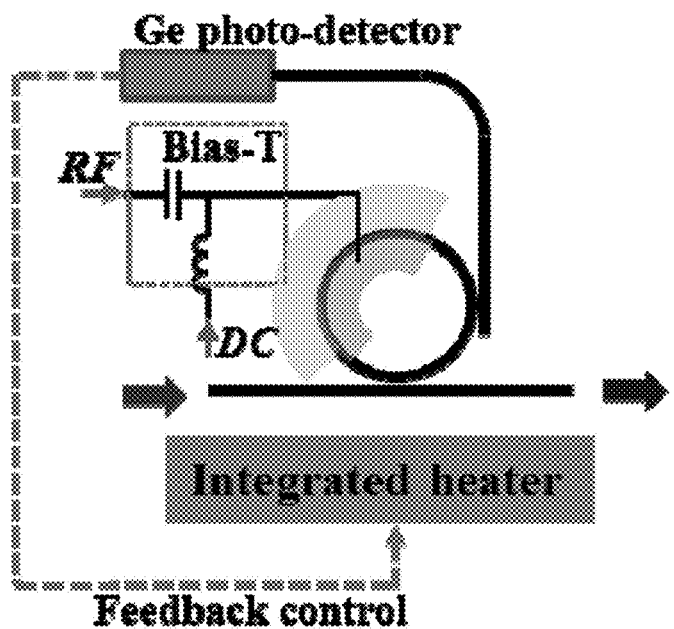
FIGS. 1 and 2 schematically illustrate resonance control in (FIG. 1) an microring modulator using a drop-port tap and (FIG. 2) a designated extrinsic defect-mediated photo-detector, integrated onto the ring resonator.
Figure 2:
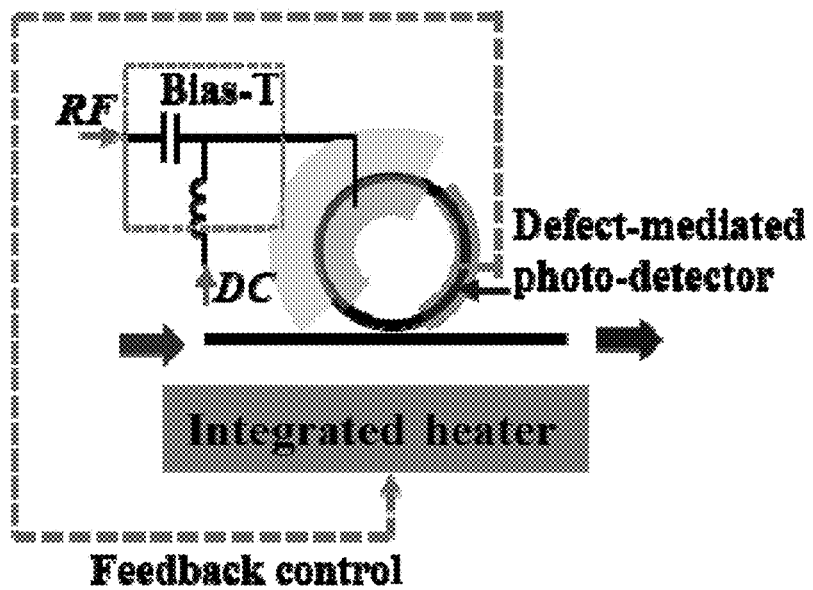

According to the present example embodiment, the integrated p-n junction that resides within the microring resonator modulator, operating in the depletion mode, is employed to provide both high-speed modulation and also to provide a feedback current to sense a change in thermal load. Unlike the schemes illustrated in FIGS. 1 and 2, no post-processing (defect implantation), drop-port germanium photodetector or heterodyne scheme is required for generating the feedback signal. Instead, the device leverages a photocurrent that is intrinsic to the microring resonator modular, thereby facilitating a resonant stabilization method that is non-invasive and can be achieved without any additional device fabrication steps.

Referring again to FIG. 3, the input optical power provided to the bus waveguide 110 is selected to be sufficiently low such that the photocurrent that is responsively generated and detected has a predominantly linear dependence on the input optical power. For example, the input optical power provided to the bus waveguide may be sufficiently low such that a linear contribution to the photocurrent exceeds a quadratic contribution to the photocurrent by a least a factor of unity, and optionally a factor greater than unity, such as 2. By selecting the input optical power to be sufficiently low to generate a photocurrent in the linear absorption regime, the resulting resonant stabilization can be controlled without suffering drawbacks associated with nonlinear (e.g. two-photon) absorption, as described in further detail below. The intrinsic linear absorption of the device as fabricated may be employed to facilitate a feedback signal, without requiring the addition of a drop-port or an integrated extrinsic detector (e.g. in the absence of extrinsic germanium components).

Accordingly, in some example embodiments, a method of stabilizing the resonance properties of an optical microring resonator modulator may be performed by: applying a time-dependent reverse bias to a p-n junction formed in the optical microring modulator to modulate input optical power provided to the bus waveguide, where the input optical power provided to the bus waveguide is sufficiently low such that an intrinsic photocurrent responsively generated due to optical absorption within the optical microring modulator is characterized by a linear contribution to the dependence of photocurrent on input optical power that exceeds a quadratic contribution; detecting the photocurrent across the p-n junction of the optical microring modulator; and employing the photocurrent as a feedback parameter to thermally stabilize the resonance properties of the optical microring modulator.

Without intending to be limited by theory, it is believed that the mechanism of linear absorption in a depletion-mode microring resonator having a p-n junction results from the presence of residual defects that persist after p-n junction formation. Such defect states, which may arise as residual lattice defects following junction formation via ion implantation and rapid-thermal-annealing, have been found to produce an adequate photocurrent for use as a feedback signal (while an integrated heater is used to compensate for thermal drift via closed-loop control). It is also suspected that linear absorption may also be conferred by the presence of defect states residing between the surface of the semiconductor (e.g. silicon) waveguide forming the microring resonator modulator and cladding oxide.

According to various example embodiments of the present disclosure, the defect-mediated photocurrent may be directly detected at the DC end of a bias-T during high-speed operation. Such a configuration is advantageous compared to the alternative configurations shown in FIGS. 1 and 2. For example, the p-n junction can be designed to maximally cover the ring resonator, e.g. having a coverage greater than 50%, 75% or even 90%, thereby increasing the modulation efficiency for the depletion-type microring resonator modulator.

Furthermore, the detection of the photocurrent can be achieved without introducing excess optical loss to the modulator beyond the intrinsic loss associated with the fabricated device.

The present example embodiments that employ the predominantly linear optical absorption for the generation of the photocurrent is advantageous over the non-linear absorption method taught by Melikyan et al. (A. Melikyan, K. Kim, Y.-K. Chen, and P. Dong, "Tapless Locking of Silicon Ring Modulators for WDM Applications," in Optical Fiber Communication Conference (2017), paper Tu2H.6), which relies on two-photon-absorption for photocurrent generation. Unlike the methods of the present disclosure, the drawback of two-photon-absorption is that a resonator with very high Q (e.g. a Q value exceeding 20,000, as employed by Melikyan et al.) together with a relatively large optical input power (e.g. input optical powers significantly exceeding 1 mW, as in Melikyan et al.) are required to generate sufficient photocarriers.

This high-Q requirement is particularly limiting because it leads to a maximum cavity bandwidth of approximately 9.5 GHz, limiting the applicability of the method to low-speed uses. Moreover, the nonlinear nature of two-photon-absorption results in a potentially large change in photocurrent for a small variation in input optical power. In contrast, the defect-mediated photocurrent mechanism employed by the present methods that employs a linear process requires much lower optical input power. As a result, the present defect-mediated methods are essentially independent of the Q-factor of the resonator. For example, while the systems and methods described herein may be implemented using microring resonator modulators having high Q values (e.g. >10,000), the present systems and methods may also be implemented with Q values in the lower range of 1000-10,000, unlike the high-Q limited teachings of Melikyan et al.

Accordingly, in stark contrast to the narrow and limited teachings of Melikyan et al, the example methods of the present disclosure are compatible with bandwidths of many tens of GHz (e.g. >=40 GHz). Indeed, the example stabilization methods described herein are not limited to a specific modulator design and are compatible with speeds greatly in excess of 12.5 Gb/s, in contrast to the bandwidth limitation of other stabilization methods that rely on intrinsic photocarrier generation through nonlinear processes such as two-photon-absorption. Furthermore, as noted above, the use of intrinsic defects that are intrinsically present after standard fabrication enables the stabilization method to be achieved without introducing excess loss.

The present example methods are also beneficial over those involving predominantly two-photon absorption when multiple microring resonator modulators are cascaded in series, such as when employed in WDM scheme. In such cases, as evidenced by the results shown in Melikyan et al., significant two-photon absorption occurs in the bus waveguide due to the generation of carriers. For example, the results of Melikyan et al. appear to indicate an additional ~3 dB of absorption above that of normal on-chip loss (this is shown where the rings that are furthest from the input generate only about half of the photocurrent than the rings closest to the input). Such an effect, which can be avoided by employing the low-power linear photocurrent generation mechanism of the present example embodiments, can have a very detrimental effect with regard to link budgets.

The linear dependence of the present example methods is also advantageous for compensating for variations in optical input power. For example, the present example methods have the benefit of correlating the absolute input power with a simple linear equation. In contrast, when a non-linear process is employed, it will be more complicated for PID control if it is desirable to correlate the current to the absolute input power.

Another benefit of the present example methods is that for most of applications, it is desirable to avoid self-heating effects. Such self-heating effects are known to occur when the predominant absorption mechanism is two-photo-absorption, leading to thermal instability and additional shifts. In contrast, the self-heating effect is not expected to be significant for the present example embodiments that facilitate operation with low input power (e.g. <1 mW) and a low Q factor (e.g. <10,000).

Referring now to FIG. 4, an example embodiment of a resonant optical modulator system is shown in which the microring resonator modular 100 is shown as a component of an integrated optical circuit 101 having on-board control circuitry 200. For example, the system shown in FIG. 4 may be implemented using an SOI architecture. As shown in the figure, a bus waveguide 110 is evanescently coupled to the microring resonator modulator 100, and input optical power 180 is coupled into the bus waveguide 110 (on-chip) from an optical source such as a laser or light-emitting diode 280. A micro-heater (not shown), such as a resistor (resistive element) is integrated (e.g. formed) on the top of the microring resonator modulator 100 to provide heat power that can vary the local temperature of the microring resonator modulator 100. The heater layer can be formed, for example, using a resistive element above the ring or alternatively as an intrinsic heater by passing an electrical current through a portion of the ring directly. This portion may be (but is not limited to) between 0 and 20% of the ring circumference.

The microring resonator modulator 100 is formed from a semiconductor material and has having a depletion-type p-n junction (formed from p and n regions 120 and 125) partially embedded in the microring 100, such that the depletion region overlaps with a modal region of the microring waveguide. As described in FIG. 3, a bias-T 130 may be employed to apply a reverse bias DC voltage to the p-n junction in order to vary the resonant properties of the microring and deliver RF signals to facilitate modulation of input optical power that is propagates through the bus waveguide, such that a time dependent reverse bias signal is delivered to the microring resonator modulator 100. The bias-T may also be employed to detect the photocurrent produced by the interaction of the input optical power 180 with the microring resonator 100.

In some example implementations, the microring resonator modulator 100 may be formed from silicon, for example, in a SOI configuration. However, it will be understood that the example implementations disclosed herein the employ SOI are merely provided as examples and that other device and material configurations may be employed without departing from the intended scope of the present disclosure. For example, in other example implementations, waveguide configurations can include of variations in material composition such as those obtained by integrating Ge with Si, or other III-V semiconductor materials such as, but not limited to, In, P, Ga, As, P, Al, such as is used commonly in the construction of a semiconductor laser. Other example waveguide configurations may employ the variation of refractive index caused by varying the electrical doping of a semiconductor material.

As shown in FIG. 4, the control circuitry 200 may be integrated with the microring resonator modulator 100 within an integrated optical circuit 101. The control circuitry 200 may include one or more processors 205, memory 210, and an interface 215 (e.g. for interfacing with the external optical source 280). The control circuitry 200 may be operatively connected to the p-n junction of the microring resonator modulator 100 for the application of the reverse bias, the delivery of RF signals thereto and the sensing of the photocurrent; to the heater for the thermal stabilization of the microring resonator modulator 100 based on the sensed photocurrent; and optionally the optical source 280 for the selection of a suitable source power in order to achieve a photocurrent that is predominantly linear in its dependence on the input optical power 180 delivered to the bus waveguide 110.

The functionalities described herein can be partially implemented via hardware logic in processor 205 and partially using the instructions stored in memory 210. Some embodiments may be implemented using processor 205 without additional instructions stored in memory 210. Some embodiments are implemented using the instructions stored in memory 205 for execution by one or more microprocessors. In some example embodiments, customized processors, such as application specific integrated circuits (ASIC) or field programmable gate array (FPGA), may be employed. Thus, the disclosure is not limited to a specific configuration of hardware and/or software.

It is to be understood that the example system shown in the figure is not intended to be limited to the components that may be employed in a given implementation. For example, the system may include one or more additional processors. Furthermore, one or more components of the control circuitry 200 may be provided as an external component that is interfaced to a processing device.

The example PID module 220 may be configured or programmed to execute algorithms, stored in the memory 210, for performing the resonant control methods described herein. For example, the feedback control algorithm may be used to control the ring resonance by a digital PID loop where the values for the three coefficient Kp, Ki and Kd are tuned for the optimum performance. In other example embodiments, the loop-control implementation can be realized by a programmable off-the-shell FPGA or, in examples provided below, by a computer which controls and links the current sensor and the micro-heater to form a closed loop. An example implementation of a control loop employing PID is described in the Examples below and shown in FIG. 9B.

At least some aspects disclosed herein can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device. A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

Several example embodiments of the present disclosure employ closed-loop feedback, such as, but not limited to, PID control, for resonant stabilization of the microring resonator modulator. A disadvantage associated with resonance locking via PID control is that the set-point current depends on the on-chip power; whereas a true resonance-locking scheme is required to maintain the detuning between the resonance and the laser wavelength. The on-chip input power can readily vary due to unavoidable performance degradation (such as a laser power change or laser to chip coupling efficiency change) over time. A subsequent calibration for the photocurrent could find a new set-point current that relates to the same detuning, but a re-calibration is disruptive to the operation and thus is undesired.

In one example embodiment, this may be addressed as follows. The set-point current is multiplied by a normalization factor, $\beta$, mathematically defined as $P(k\Delta t)/P(0)$ where $P(k\Delta t)$ is the measured on-chip input power at each discrete time step $k\Delta t$ in the PID loop and $P(0)$ is the initial on-chip input power in the PID loop. In this manner, the influence of the input power variation can be negated by the normalized set-point current that always corresponds to the same detuning. This is only true when the on-chip input power and the photocurrent have a linear dependency, which is the case for the detection mechanism described in several embodiments of the present disclosure. This method requires a means to measure the on-chip power, for example, prior to the modulator, via a tap-port terminated with an integrated detector. In order to maintain our Ge-free process, the detector could be formed through an extrinsic defect mediated detection mechanism, for example, as described by Bradley et al. (Bradley et al., Appl. Phys. Lett. 86, 241103, 2005).

Examples

The following examples are presented to enable those skilled in the art to understand and to practice embodiments of the present disclosure. They should not be considered as a limitation on the scope of the disclosure, but merely as being illustrative and representative thereof.

In the Examples provided below, resonance control is demonstrated using the photocurrent intrinsically generated in a depletion-type p-n junction from a high-speed microring resonator modulator designed with a deep-notch. The dependency of the photocurrent on input power is shown to be linear in nature. A computer-controlled digital PID loop is described and the control algorithm is discussed. High-speed measurements utilizing eye-diagrams and back-to-back bit error rate (BER) measurements are shown to verify the control capability. A solution to overcome the instability of the PID control that results from optical input power fluctuation is proposed based on the linear property of the defect-mediated photo-absorption. Consequently, the example embodiments described in the present disclosure may provide a route to silicon photonic circuit transmitter fabrication from which all germanium integration (most commonly used for power monitoring) can be removed.

Device Fabrication and Static Characterization

A microring resonator modulator was fabricated using 220 nm SOI through the multi-project-wafer shuttle service at A*star, IME, Singapore. The all-pass ring resonator with a 12-μm radius had a depletion p-n junction coverage of 88% of the perimeter. The waveguide dimension was 220 nm (height)×500 nm (width) with a 90 nm slab providing electrical contact. The nominal doping concentrations of the p-dopant and n-dopant were $5*10^{17}$ cm and $3*10^{18}$ cm$^{-3}$, respectively with a doping offset of 75 nm towards the n-doped region so that the majority of the waveguide was p-doped. The junction design provides for efficient use of the plasma dispersion effect owing to an increased overlap between the optical mode and the depletion region. It is noted that it has been shown previously that lattice defects in p-doped silicon produce a significantly higher photo-absorption than n-type silicon due to a larger availability of the neutrally charged defects. As a result, the p-n junction present example design is beneficial in design for carrier generation.

The total cavity loss due to carrier absorption in the unbiased ring was estimated to be 35 dB/cm. Heavily doped contact regions were located 800 nm away from the either side of the waveguide edge to avoid parasitic absorption of the signal within the ring. The gap between the ring and bus was 265 nm (based on FDTD simulation) to match the coupled power to the cavity loss so that the critically coupled condition was anticipated. Both the junction offset and the coupling gap were varied through multiple device designs in order to counteract fabrication variation.

The optical spectra measured using a tunable laser source under different reverse bias (ranging from 0 to −4 V) are shown in FIGS. 5A and 5C for two selected modulator designs with different junction offsets and gap distances (thus different Q-factors). The notch depth (>25 dB) and DC modulation efficiency (>17 pm/V) as seen in FIG. 5A validate the design optimization with the realization of an almost critically coupled modulator. The full width at half maximum (FWHM) at −2 V bias for device A was approximately 0.15 nm and the Q-factor was approximately 10,000, derived from the ratio of resonance and FWHM. The free spectral range (FSR) was measured to be 8.3 nm. Thus, the finesse, defined as the ratio of FSR and FWHM, was calculated to be 55.3.

As the tunable laser source was swept, a source-meter provided the junction reverse bias through a pair of DC probes and simultaneously recorded the photocurrent that results from the intrinsic sub-bandgap absorption, the results of which are shown in FIGS. 5B and 5D. The photo-detection benefits from a large optical power build-up in the ring resonator. At resonance, the build-up factor (BUF) is proportional to the finesse (BUF=finesse×2/π) under the assumption of a critically coupled condition and calculated to be 36.9 for a finesse of 55.3. For a relatively low optical input power, photocurrent can be measured even in the absence of a reverse bias. The peak photocurrent increases proportionally with increases in reverse bias due to the improved carrier collection efficiency of the device.

The photocurrent measured for device B (with Q-factor of approximately 7500) was lower than that measured for device A mainly due to two reasons. Firstly, lower Q-factor results in a smaller finesse that consequently reduces the BUF. Secondly, the junction offset in device B does not provide an optimal overlap between the center of the optical mode and the center of the depletion region. However, the photo-absorption mechanism, as well as the resonance control described in the present disclosure, would be applicable in both cases A and B. Device A was selected for the remainder of the experimental examples described below.

Figure 6A:
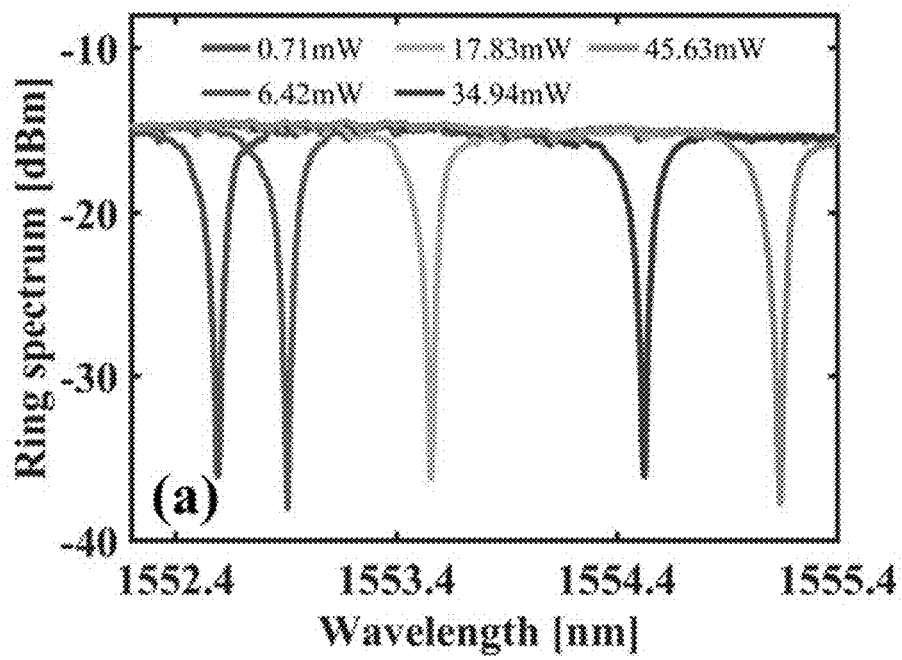
FIG. 6A plots the measured microring resonator spectra for different heater powers (the resonant peaks, from left to right, correspond to 0.71 mW, 6.42 mW, 17.83 mW, 34.94 mW and 45.63 mW).
Figure 6B:
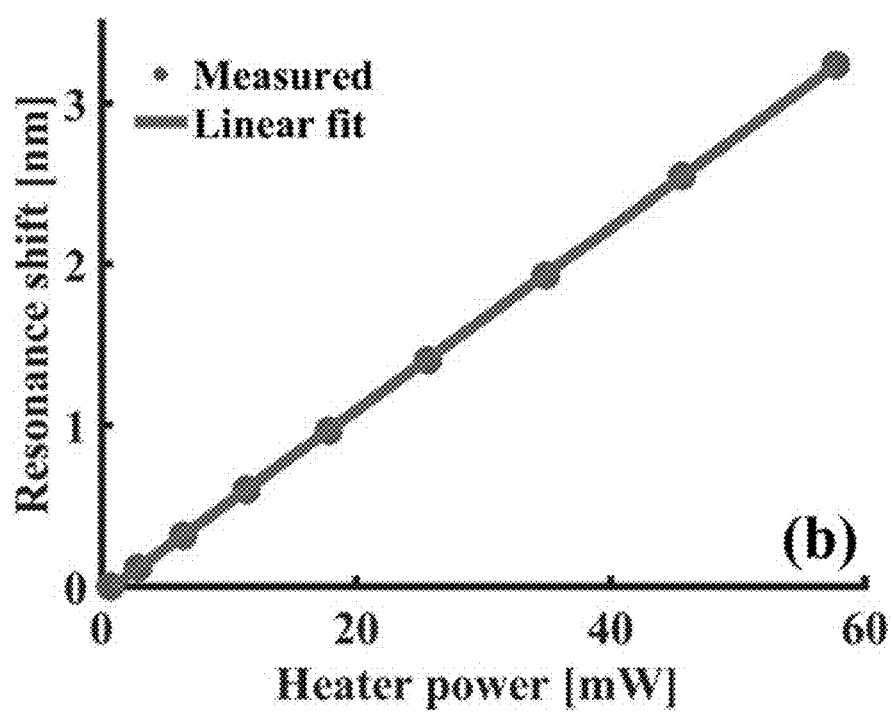
FIG. 6B plots the extracted resonance shift with respect to the applied heater power using a linear fit.

An integrated resistive heater located above the ring waveguide provided a local heating mechanism. To obtain the heater efficiency, optical spectra with zero electrical bias on the p-n junction were obtained for a range of heater powers, with the results plotted in FIG. 6A. The resonance shift versus heater power was extracted and through a linear fit as shown in FIG. 6B, the heater efficiency (defined as resonance shift per mW) was determined to be 56.8 pm/mW. This calculation includes the parasitic resistance associated with the wire bonding of the integrated heater to a carrier PCB.

In order to study the linearity of the photo-absorption mechanism described here (and thus to provide evidence for its origin), the photocurrent was first measured against a range of on-chip (optical) power. The laser wavelength was fixed at 1554 nm (red-side of the resonance indicated by FIG. 7A) so that addition or removal of a bias to the heater could produce a red or blue shift respectively. A sub-mounted temperature controller (TEC) maintained the temperature of the chip at 25° C. The photocurrent was recorded at the DC port of the bias-T when the heater power was increased from 0 mW to 60 mW to ensure that the laser wavelength could scan across the entire resonance notch. The laser power was varied from 0.2 mW to 2.4 mW in steps of 0.2 mW. Furthermore, it was observed that the insertion losses (defined as the laser power at off-resonance wavelength minus the received optical power at off-resonance wavelength) obtained for different laser powers were essentially constant (17.5 dB), indicating any TPA effect was negligible in the bus waveguide and the on-chip power was in fact linearly varied.

Figure 7B:
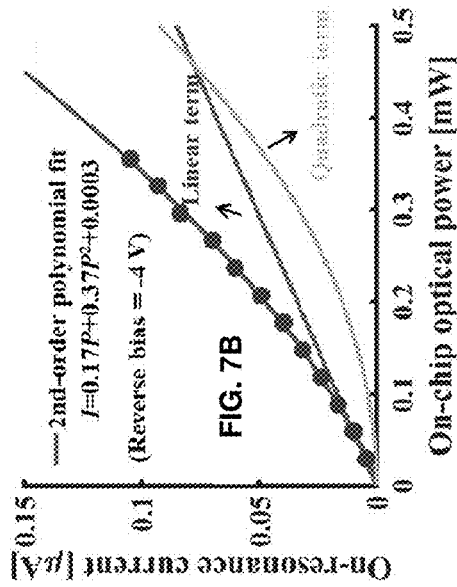
FIG. 7B shows a 2nd-order polynomial fit of the photocurrent curve at reverse bias −4 V, separating the photocurrent components that result from the linear-absorption and non-linear-absorption.
Figure 7D:
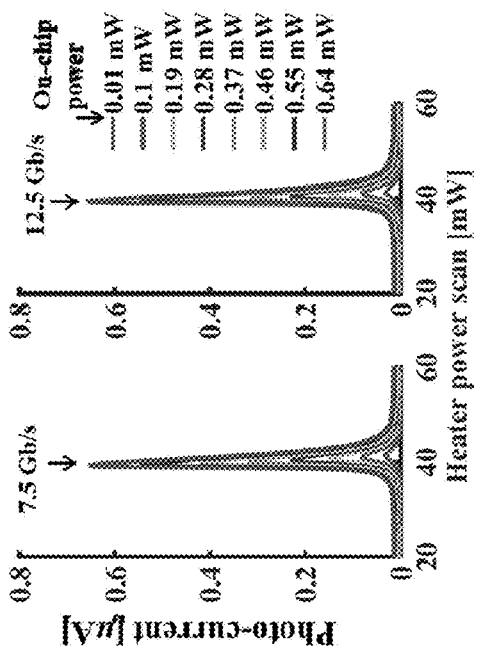
FIG. 7D plots the measured photocurrent versus the heater power for two data rates: 7.5 Gb/s and 12.5 Gb/s RF signals with 2 V peak-to-peak voltage and −2 V DC offset.
Figure 7A:
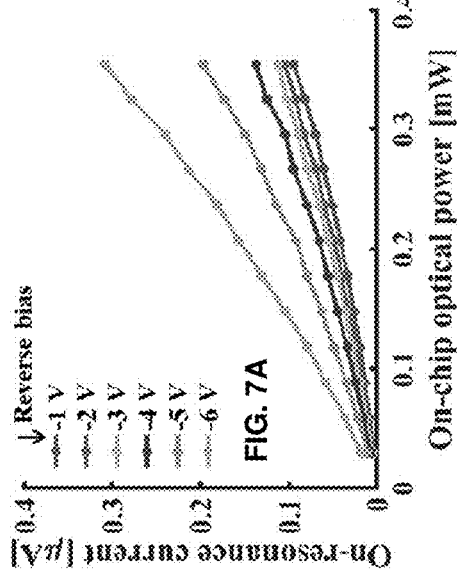
FIG. 7A plots the measured photocurrent versus the on-chip power estimated at the ring resonator input for different reverse bias (ranging from −1 V to −6 V).

The photocurrent versus reverse bias is shown in FIG. 7A. Values for the on-chip power were calculated by subtracting the input grating coupler loss and the propagation loss from the laser output power. In FIG. 7B, a 2nd-order polynomial fit of the photocurrent curve at a reverse bias of −4 V is performed and used to separate the photocurrent into the linear term and the quadratic term (i.e. those resulting from the defect-mediated photo-absorption and TPA-induced photo-absorption, respectively). The responsivity of the linear photo-detection for this specific bias (−4 V) is extracted to be 0.17 mA/W.

Figure 7C:
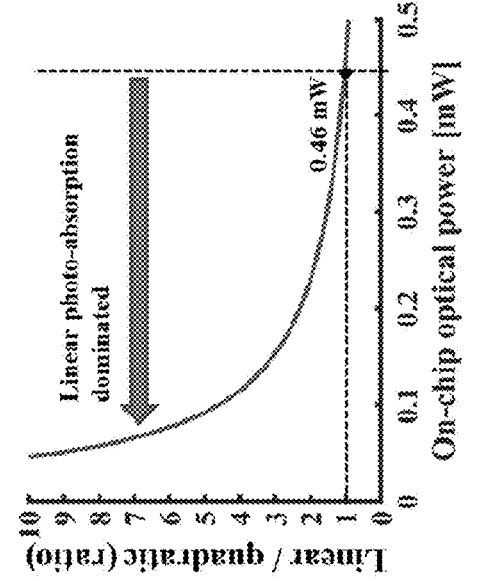
FIG. 7C plots the ratio of the linear term (0.17P) and quadratic term ($0.37P^2$) for different on-chip power.

In FIG. 7C, the ratio of the linear term and the quadratic term is shown, allowing one to deduce that the defect-mediated photo-absorption (linear) should be the dominant detection mechanism when the on-chip power is lower than 0.46 mW. As the on-chip power increases, TPA-induced photo-absorption begins to dominate.

The bias-T was used to combine the RF signal and DC bias and the modulated electrical signal was delivered to the ground-signal-ground pads of the device through a high-speed RF probe. The measured photocurrent at the DC port of the bias-T should correspond only to the DC-level intensity in the ring regardless of the bit rate. To confirm this, an experiment was conducted to study the influence of the RF drive on the generated photocurrent. The peak-to-peak voltage for the RF signal was set to 2 V and the reverse bias was maintained at −2 V to insure the junction remained in a reverse bias condition during operation.

The measured photocurrent when the heater power was increased from 0 mW to 60 mW for a range of on-chip input powers is shown in FIG. 7D for 7.5 Gb/s and 12.5 Gb/s non-return-to-zero (NRZ) signals. The measured photocurrents are almost identical, indicating that there is no discernable influence from the RF drive signal, a consequence of good electrical isolation between the DC and RF ports of the bias-T.

Ideally, initial conditions such as the reverse bias and the on-chip input power should remain unchanged during high-speed operation so that the measured defect-mediated photocurrent, such as those shown in FIG. 7D, will relate to the optical transfer of the microring resonator modulator. Resonance locking was achieved by maintaining the defect-mediated photocurrent intensity via feedback control (such as a PID loop) to a set-point current that corresponds to a specific resonance detuning.

Figure 8A:
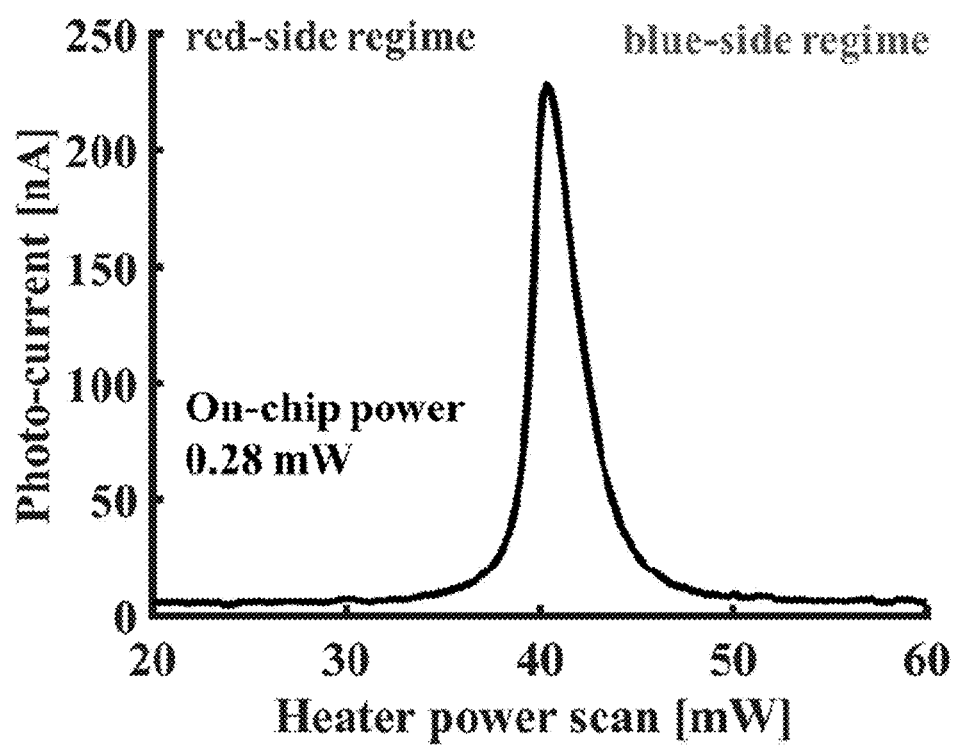
FIGS. 8A and 8B plot (A) modulation regimes for the microring resonator and (B) eye-diagrams at different photocurrents for a 12.5 Gb/s NRZ modulation.
Figure 8B:
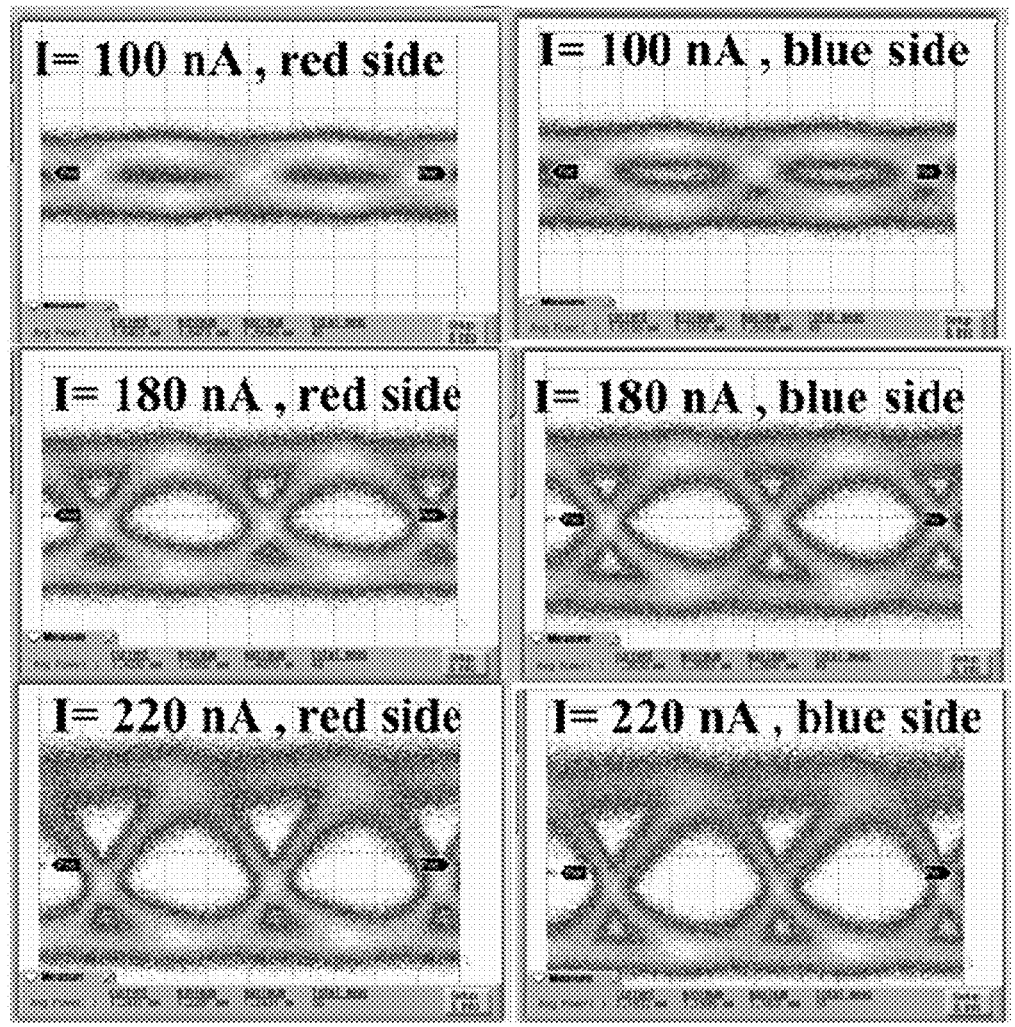

FIG. 8A gives an example of the measured photocurrent with 0.32 mW on-chip power and FIG. 8B shows the resulting different optical eye-diagrams with 2 V peak-to peak voltage obtained while the resonance was locked such as to provide different photocurrents. The chip temperature was stabilized by the sub-mounted TEC and the set-point current was tuned manually via the integrated heater.

Modulation can either occur at the blue-side or the red-side of the resonance, which will result (among other outcomes) in an opposite chirp. However, it should be noted that the red-side modulation would suffer more from self-heating effects that can be readily seen by the skew appearing in the photocurrent plot in FIG. 7D; further these effects would become more dramatic as the input optical power increases. The drawback of an excessive self-heating effect is that the resonance is more difficult to stabilize (partially also due to a sharper slope of the transfer), thereby leading to a certain amount of relative eye-closure (compared to blue-side modulation) as demonstrated in FIG. 8B.

Resonance Control Algorithm and BER Measurement

Figure 9A:
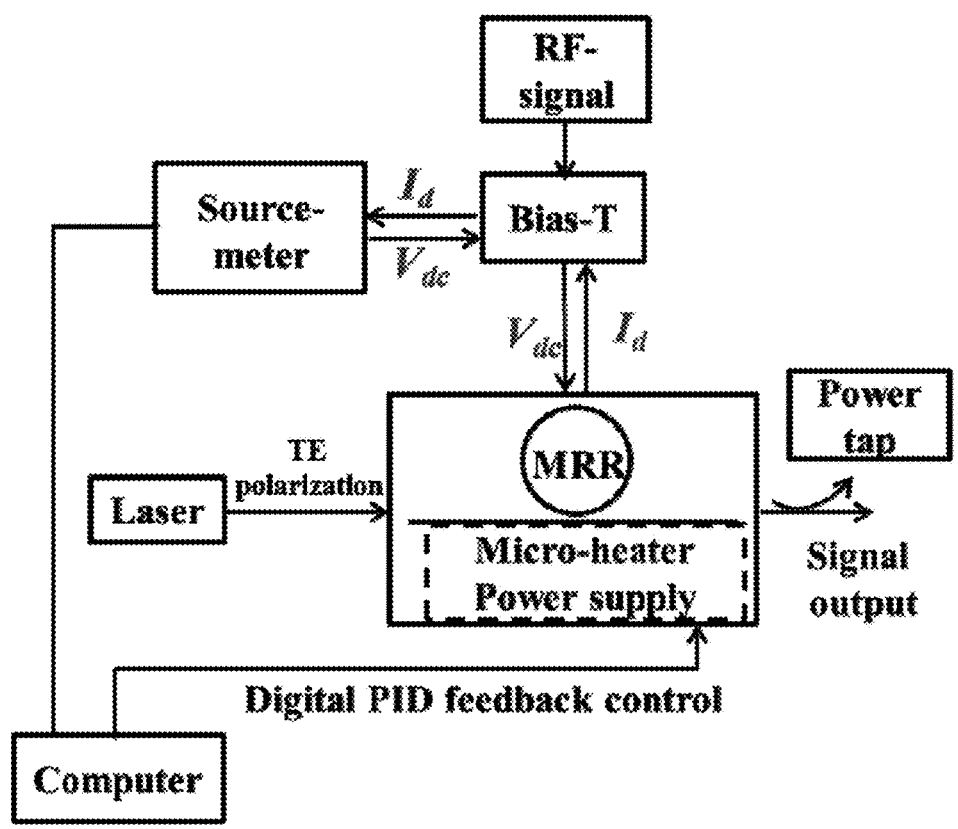
FIG. 9A is a block diagram of the experimental measurement setup employed during the example described herein.
Figure 9B:
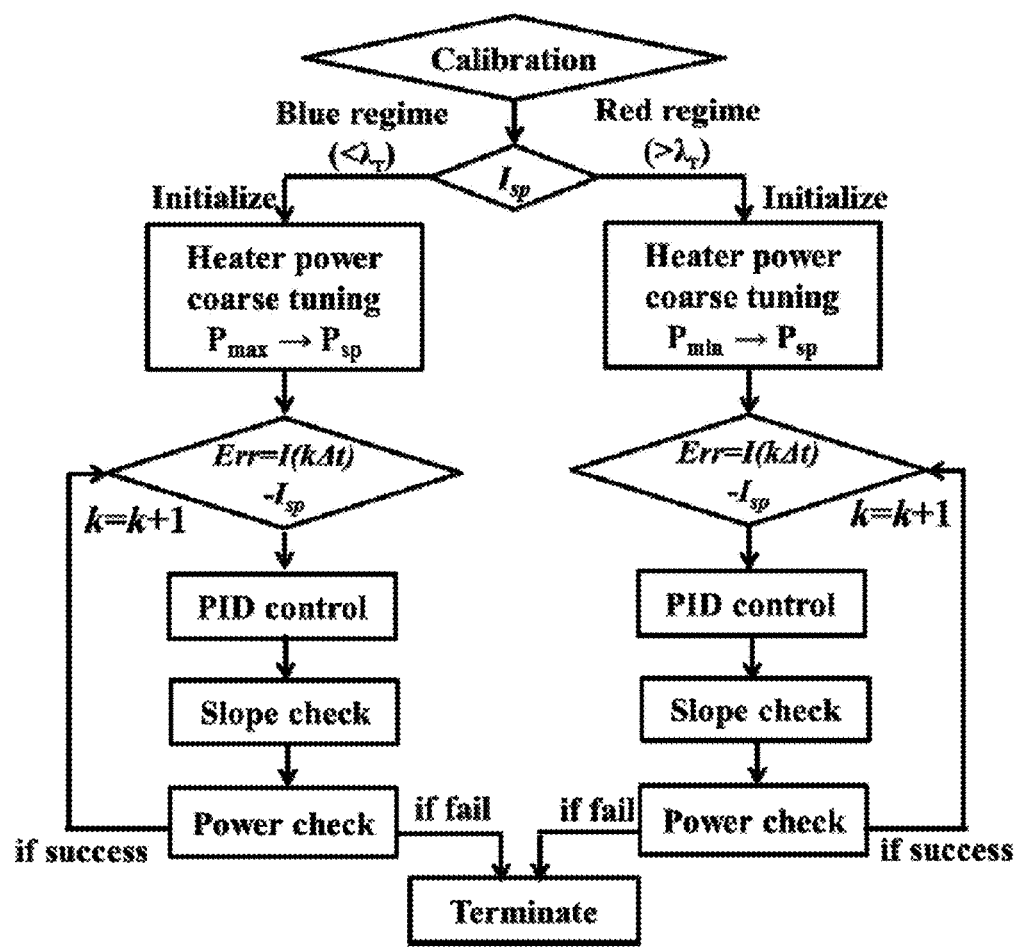
FIG. 9B is a flow chart illustrating an example method of an example control algorithm for stabilizing the resonant properties of a microring resonator.

FIGS. 9A and 9B show the experimental setup for control measurement and the computerized control algorithm, respectively. The source-meter and heater power supply formed a closed feedback loop, controlled by a computer. The experimental conditions were the same as those used to generate the data in FIGS. 8A and 8B. In addition, an off-chip optical power meter was used to tap a small portion (10%) of the output optical power to ensure that the on-chip input power remained constant. In the configuration employed in the present example, the primary causes for a change of the on-chip input power is fiber drift from the optimum coupling location. During operation, a 1 dB variation was typically observed in on-chip power for experiments that require many minutes of operation.

To implement the example control algorithm shown in FIG. 9B, the program first sweeps the heater power from a pre-defined minimum $P_{min}$ (0 mW) to a maximum $P_{max}$ (60 mW) to record a defect-mediated photocurrent such as the one shown in FIGS. 8A and 8B. Then, a set-point current $I_{SP}$ is chosen for a desired modulation condition, which depends on the slope (blue or red) of the ring transfer to be modulated. The heater power is coarsely tuned either from $P_{min}$ to $P_{max}$ for red-side modulation or from $P_{max}$ to $P_{min}$ for blue-side modulation. Once the measured photocurrent approaches $I_{SP}$ the PID loop is turned on for fine tuning and eventually locks the resonance at $I_{SP}$. The period for the control-loop cycle was 1 ms, limited (in the present example case) by the communication delay between the computer and the control apparatus.

Confirmation of the slope type (red or blue) was achieved by providing a very small power change to the heater and measuring the resulting current change in the detector (for example, if the modulation is on the blue side, increasing the heater power will reduce the photocurrent). Maintenance of the optical input on one or other of the slopes during operation is beneficial to avoid an unstable system (and thus thermal runaway). In addition, the off-chip tap power is used to monitor the variation of the input power. If this is larger than 2 dB (assuming the losses at input coupling and output coupling are similar), the control loop is forced to halt to prevent a situation where the photocurrent is lower than $I_{sp}$.

Figure 10A:
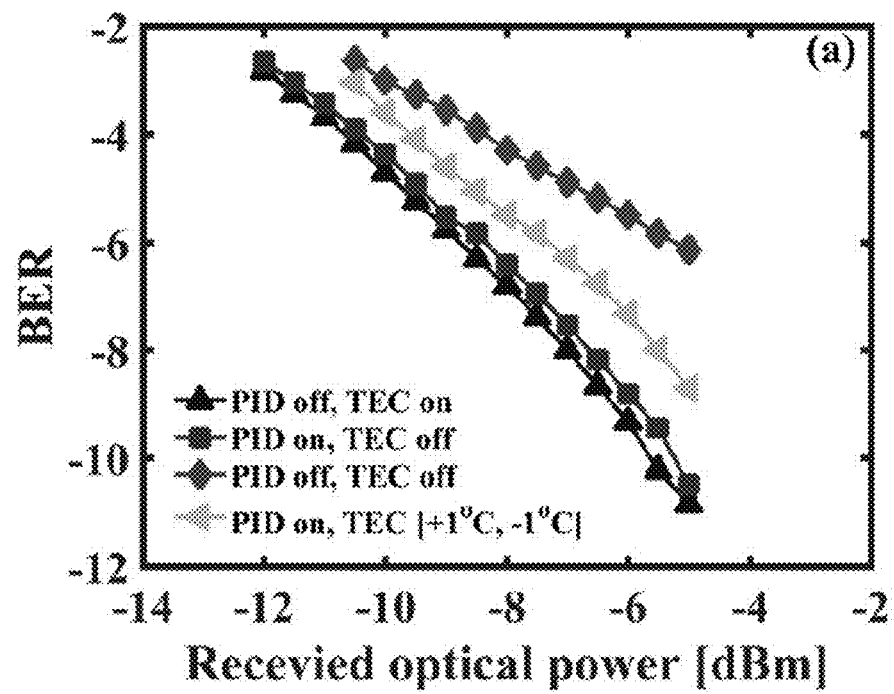
FIGS. 10A-10C plot (A) the measured BER of a 12.5 Gb/s rate for several conditions, and (B) recorded error currents, and (C) associated eye-diagrams.

Bit-Error-Rate (BER) measurements were used to evaluate the control algorithm. Several BER curves for a 12.5 Gb/s signal under different operating conditions are plotted for comparison in FIG. 10A. $I_{SP}$ was set to 180 nA on the blue-side of resonance to avoid excessive self-heating, while other driving conditions remained the same as those used to generate the data for FIGS. 7A and 7B. The BER was first tested when either the sub-mounted TEC control or the on-chip control was disabled. The difference between the two BER curves is very small, meaning that the on-chip PID control is as stable as the sub-mounted TEC control (which of course is also a PID control). The BER was then obtained when both controls were disabled. The measured BER was significantly degraded, resulting from an uncontrolled microring resonator modulator exposed to the variable lab environment. Lastly, a slow temperature variation of ±1° C. was intentionally created on the sub-mount using the TEC and measured the BER with the on-chip control on or off. Eye-diagrams were captured at random times with each eye-diagram based on 50 sweeps. With the on-chip control disabled, the eye-diagrams were completely distorted because of the large resonance drifting, leading to an immeasurable BER. However, when the on-chip control was implemented, the eye-diagram maintained the shape at the set point relatively faithfully due to successful locking. The BER curve exhibited a small power penalty of around 1 dB compared to a condition of TEC enabled thermal stabilization. The degradation was related to variation of the fiber-to-chip coupling (observed via our off-chip tap) when the sub-mount was heated and cooled.

Figure 10B:
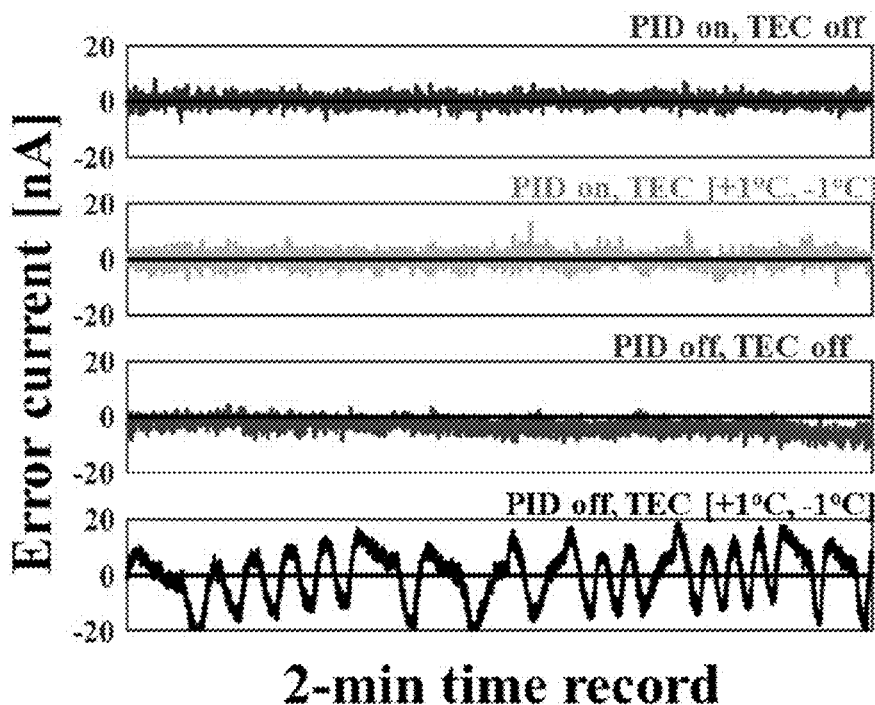
Figure 10C:
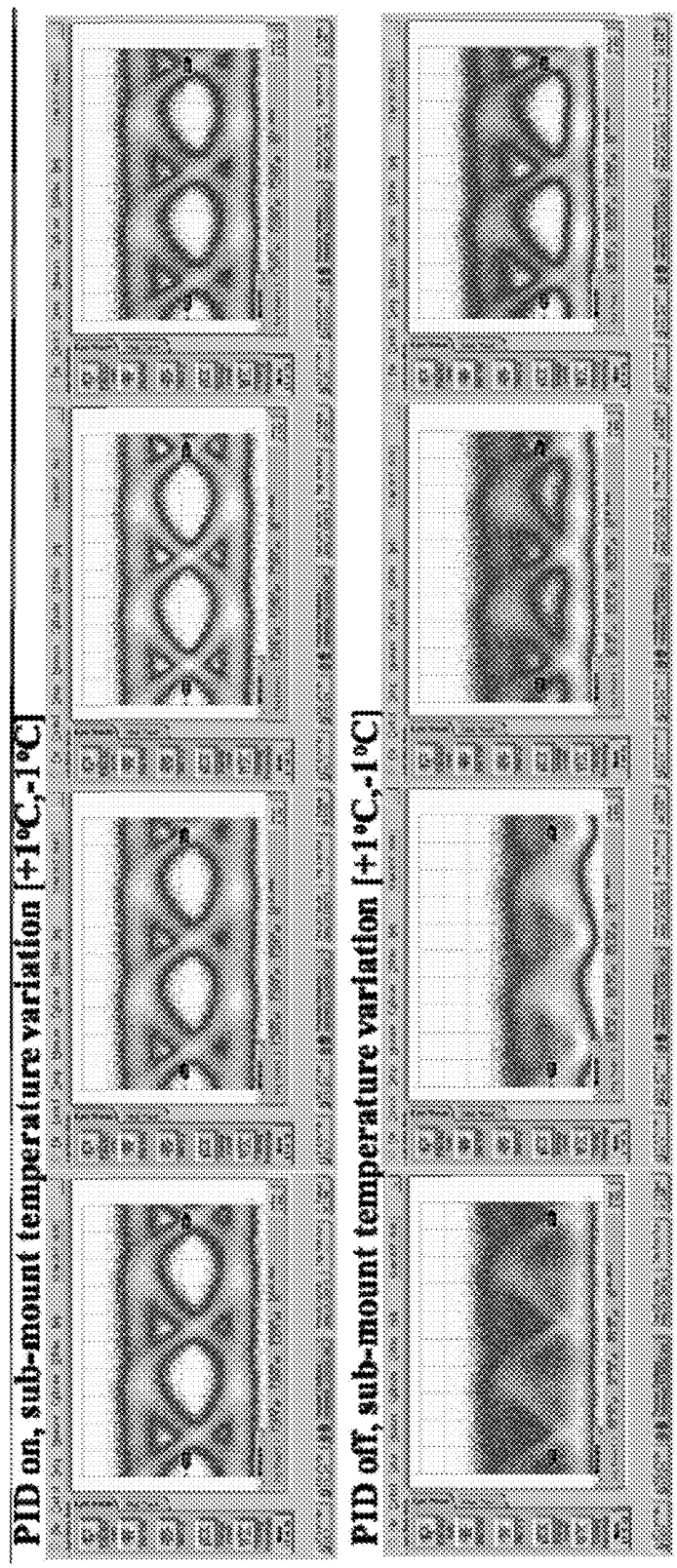

The error current $(I(k\Delta t)-I_{sp})$ in the PID loop was also recorded at each discrete time $k\Delta t$ in order to evaluate the previous analysis. A series of error currents recorded within 2 minutes for different conditions are plotted in FIG. 10B. When the on-chip control is enabled, the error current is centered at the zero level (shown as the black line) over time, which indicates a functional and stable PID loop that maintains the set-point current. When both controls are disabled, the error current simply reflects a temporal change of the photocurrent and in fact the error current slowly walks off the zero level, indicating a resonance change that was not compensated. When the temperature variation was induced and the on-chip control is off (black line), the error current records how large the deviation is without a feedback control. The peak current variation with ±1° C. temperature fluctuation was estimated to be 40 nA. The maximum thermal tuning power required to stabilize the resonance at the set-point current (180 nA) is approximately 0.5 mW, which is deduced from FIGS. 7A and 7B. The heater resistor is 1400Ω, thereby giving the maximum thermal voltage swing to be 60 mV. It is noted that the intentional temperature variation in the present experiment is modest. The present experimental set-up limits it such that increasing the variation beyond ±1° C. would cause an unacceptable misalignment of the input fiber and the chip. However, there is no fundamental reason as to why the technique shown here could not be applied to compensate more considerable variation for a packaged system with permanent fiber attached.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of stabilizing the resonance properties of an optical microring modulator, wherein the optical microring modulator is evanescently coupled to a bus waveguide, the method comprising:
    applying a time-dependent reverse bias to a p-n junction formed in the optical microring modulator to modulate input optical power provided to the bus waveguide;
    detecting, across the p-n junction of the optical microring modulator, a photocurrent responsively generated due to optical absorption; and
    employing the photocurrent as a feedback parameter to thermally stabilize the resonance properties of the optical microring modulator;
    wherein the input optical power provided to the bus waveguide is sufficiently low such that a linear contribution to the dependence of photocurrent on input optical power exceeds a quadratic contribution.

2. The method according to claim 1 wherein the input optical power provided to the bus waveguide is selected such that the linear contribution to the photocurrent is predominantly generated by linear absorption of intrinsic residual defects created during formation of the p-n junction.

3. The method according to claim 1 wherein the input optical power provided to the bus waveguide is sufficiently low such that the linear contribution to the photocurrent exceeds the quadratic contribution to the photocurrent by at least a factor of 2.

4. The method according to claim 1 wherein the optical microring modulator is thermally stabilized in the absence of use of a drop port or an integrated extrinsic detector.

5. The method according to claim 1 wherein the optical microring modulator is thermally stabilized in the absence of use of a germanium detector.

6. The method according to claim 1 wherein a quality factor of the optical microring modulator lies between approximately 1000 and 10,000.

7. The method according to claim 1 wherein the p-n junction extends over at least 70% of the perimeter of the optical microring modulator.

8. The method according to claim 1 wherein the p-n junction extends over at least 80% of the perimeter of the optical microring modulator.

9. The method according to claim 1 wherein the p-n junction extends over at least 90% of the perimeter of the optical microring modulator.

10. The method according to claim 1 wherein the input optical power provided to the bus waveguide is modulated at a frequency of at least 40 GHz.

11. The method according to claim 1 wherein the optical microring modulator is formed in silicon.

12. The method according to claim 1 wherein the feedback is provided via a p-i-d controller.

13. The method according to claim 1 wherein the p-n junction is shifted such that a majority of the cross-section of the optical microring modulator is p-doped.

14. The method according to claim 1 wherein the optical microring modulator is thermally stabilized by maintaining the photocurrent relative to a set-point photocurrent.

15. The method according to claim 14 wherein the set-point photocurrent is normalized according to a measure associated with the input optical power.

16. A method of stabilizing resonance properties of an optical microring modulator, wherein the optical microring modulator is evanescently coupled to a bus waveguide the method comprising:

applying a time-dependent reverse bias to a p-n junction formed in the optical microring modulator to modulate input optical power provided to the bus waveguide;

detecting, across the p-n junction of the optical microring modulator, a photocurrent responsively generated due to optical absorption; and employing the photocurrent as a feedback parameter to thermally stabilize the resonance properties of the optical microring modulator;

wherein the input optical power provided to the bus waveguide is sufficiently low such that the photocurrent is predominately generated via linear absorption of sub-band defects.

17. A stabilized resonant optical modulator system comprising:

a bus waveguide;

an optical microring modulator evanescently coupled to the bus waveguide, the optical microring modulator comprising a p-n junction;

an optical power source configured to deliver input optical power to the bus waveguide;

a heater configured to apply heat to the optical microring modulator; and control circuitry operably connected to the optical microring modulator and the heater, wherein the control circuitry is configured to:

apply a time-dependent reverse bias to the p-n junction formed in the optical microring modulator to modulate the input optical power provided to the bus waveguide;

detect, across the p-n junction of the optical microring modulator, a photocurrent responsively generated due to optical absorption; and control the heater according to a feedback signal generated based on the photocurrent to thermally stabilize resonance properties of the optical microring modulator;

wherein the optical power source is configured to provide the input optical power to the bus waveguide such a linear contribution to the dependence of photocurrent on input optical power exceeds a quadratic contribution.

18. The system according to claim 17 wherein the optical power source is configured such that the input optical power provided to the bus waveguide is selected such that the linear contribution to the photocurrent is predominantly generated by linear absorption of intrinsic residual defects created during formation of the p-n junction.

19. The system according to claim 17 wherein the optical power source is configured to provide the input optical power to the bus waveguide such that the linear contribution to the photocurrent is predominantly generated by linear absorption of intrinsic residual defects created during formation of the p-n junction.

20. The system according to claim 17 wherein the optical power source is configured to provide the input optical power to the bus waveguide such that the linear contribution to the photocurrent is generated, at least in part, by linear absorption of defects states residing at the interface between a cladding oxide layer formed on the optical microring modulator.

21. The system according to claim 17 wherein the optical power source is configured such that the input optical power provided to the bus waveguide is sufficiently low such that the linear contribution to the photocurrent exceeds the quadratic contribution to the photocurrent by at least a factor of 2.

22. The system according to claim 17 wherein optical microring modulator is thermally stabilized in the absence of a drop port or an integrated extrinsic detector.

* * * * *